(12) United States Patent
Päbel (10) Patent No.: US 8,784,019 B2
(45) Date of Patent: Jul. 22, 2014

(54) DRILLING TOOL FOR CHIP REMOVING MACHINING AS WELL AS A LOOSE TOP AND A BASIC BODY THEREFOR

(75) Inventor: Helena Päbel, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 1011 days.

(21) Appl. No.: 12/818,761

(22) Filed: Jun. 18, 2010

(65) Prior Publication Data

US 2010/0322729 A1 Dec. 23, 2010

(30) Foreign Application Priority Data

Jun. 23, 2009 (SE) ........................ 0900848

(51) Int. Cl.
*B23D 71/00* (2006.01)
(52) U.S. Cl.
USPC .......................... 408/231; 408/227
(58) Field of Classification Search
USPC .................. 408/200, 230, 231, 227; 29/428
See application file for complete search history.

(56) References Cited

U.S. PATENT DOCUMENTS

| | | | |
|---|---|---|---|
| 6,506,003 B1 | 1/2003 | Erickson | |
| 6,840,717 B2 | 1/2005 | Eriksson | |
| 7,309,196 B2 * | 12/2007 | Ruy Frota de Souza | 408/227 |
| 7,377,730 B2 | 5/2008 | Hecht et al. | |
| 7,625,161 B1 | 12/2009 | Ruy Frota de Souza | |
| 8,021,088 B2 | 9/2011 | Hecht | |
| 8,556,552 B2 | 10/2013 | Hecht | |
| 2008/0193237 A1 | 8/2008 | Men et al. | |
| 2008/0193238 A1 | 8/2008 | Hecht | |
| 2010/0266357 A1 | 10/2010 | Kretzschmann et al. | |

FOREIGN PATENT DOCUMENTS

| | | |
|---|---|---|
| CN | 1956813 A | 5/2007 |
| DE | 10 2007 044 095 A1 | 3/2009 |
| JP | 2004-527391 | 9/2004 |
| JP | 2005-169542 | 6/2005 |

(Continued)

OTHER PUBLICATIONS

Office Action for European Patent Application No. 10 165 329.3, dated Nov. 9, 2010.

(Continued)

*Primary Examiner* — David Bryant
*Assistant Examiner* — Ryan J Walters
(74) *Attorney, Agent, or Firm* — Morgan, Lewis & Bockius LLP (57) ABSTRACT

A loose top for drilling tools, including front and rear ends, a pair of envelope part surfaces concentric with a center axis, and two chip flutes countersunk in relation to the pair of envelope part surfaces between which two bars project radially from a central core, the front end including a cutting edge and at least one clearance surface positioned rotationally behind the cutting edge, the rear end forming an axial contact surface. The loose top includes two opposite side contact surfaces against which elastically bendable branches of a tool basic body are pressed in use, a pair of convex guide surfaces situated axially behind the side contact surfaces, the guide surfaces being concentric with the center axis and radially spaced-apart from the center axis at a distance that is less than the radial distance between the center axis and a respective side contact surface, and a pair of torque-carrying tangential contact surfaces that are situated radially inside the envelope part surfaces and outside the side contact surfaces. The axial contact surface extends perpendicular to the center axis between borderlines adjacent to the two envelope part surfaces.

26 Claims, 10 Drawing Sheets

(56) References Cited

FOREIGN PATENT DOCUMENTS

| JP | 2006-167871 | 6/2006 |
| JP | 2010-517800 | 5/2010 |
| WO | WO 2008/072840 A2 | 5/2005 |
| WO | WO 2005/115667 A1 | 12/2005 |
| WO | WO 2008/099378 | 8/2008 |
| WO | WO 2009/037020 A1 | 3/2009 |

OTHER PUBLICATIONS

Notification of First Office Action (with English translation) for Chinese Patent Application No. 201010217755.9; dated Aug. 23, 2013.

Notice of Reason for Rejections (with English translation) for Japanese Patent Application No. 2010-142816, dated Mar. 4, 2014.

* cited by examiner

DRILLING TOOL FOR CHIP REMOVING MACHINING AS WELL AS A LOOSE TOP AND A BASIC BODY THEREFOR

This application claims priority under 35 U.S.C. §119 to Swedish Patent Application No. 0900848-3, filed on Jun. 23, 2009, which is incorporated by reference herein in its entirety.

FIELD OF THE INVENTION

The present invention relates generally to a drilling tool for chip removing machining, including a basic body and a loose top. The basic body includes front and rear ends, and an envelope surface that includes two countersunk chip flutes and is concentric with a first center axis around which the basic body is rotatable in a given direction of rotation. The loose top includes front and rear ends, a pair of envelope part surfaces concentric with a second center axis, and two chip flutes countersunk in relation to the pair of envelope part surfaces between which two bars project radially from a central core, the front end including a cutting edge and at least one clearance surface positioned rotationally behind the cutting edge, the rear end forming an axial contact surface. The invention also relates to a loose top and a basic body as such.

Drilling tools of the kind in question are suitable for chip removing or cutting machining (above all hole making) of workpieces of metal, such as steel, cast iron, aluminium, titanium, yellow metals, etc. The tools may also be used for the machining of composite materials of different types.

BACKGROUND OF THE INVENTION

For more than a decade, drilling tools have been developed that, contrary to solid drills, are composed of two parts, viz. a basic or drill body and a head detachably connected with the same and thereby being replaceable, and in which head the requisite cutting edges are included. In such a way, the major part of the tool can be manufactured from a comparatively inexpensive material having a moderate modulus of elasticity, such as steel, while a smaller part, viz. the head can be manufactured from a harder and more expensive material, such as cemented carbide, cermet, ceramics and the like, which gives the cutting edges a good chip-removing capacity, a good machining precision and a long service life. In other words, the head forms a wear part that can be discarded after wear-out, while the basic body can be re-used several times (e.g., 10 to 20 replacements). A now recognized denomination of such, cutting edge-carrying heads is "loose tops", which henceforth will be used in this document.

On drilling tools of the loose top type, a plurality of requirements are put, one of which is that the loose top should be mountable and dismountable in a rapid way convenient to the operator without the basic body necessarily having to be removed from the driving machine. Furthermore, torque should be transferable in a reliable way from the rotatable, driven basic body to the loose top. Another requirement is that the basic body should, without problems, be able to carry the rearwardly directed axial forces that the loose top is subjected to during drilling. Furthermore, the loose top should be held centered in a reliable way in relation to the basic body. Yet another requirement is that the loose top should be fixedly held to the basic body not only during drilling of a hole, but also during retraction of the drilling tool out of the same. In addition, the tool, and in particular the loose top manufactured from an expensive material, should be possible to be manufactured at low costs.

A drilling tool of the type defined in the preamble of claim 1 is previously known by U.S. Pat. No. 6,506,003 B1. Features of this drilling tool are that the envelope surface of the loose top extends only along approximately half the length of the loose top, viz. from the front, cutting edge-carrying end to a pair of transverse shoulder surfaces that form transitions to two side contact surfaces being axially behind, against which the inner support surfaces of elastically bendable branches are pressable in order to resiliently clamp the loose top. The side contact surfaces are formed on a pin-like part which protrudes axially rearward in relation to the rear shoulder surfaces of the envelope surface, and which at its rearmost end includes a pair of convex guide surfaces. For the transfer of torque from the basic body to the loose top, the last-mentioned one is formed with a pair of lugs that project a short distance rearward in relation to the rear shoulder surfaces of the envelope surface. Co-operating tangential support surfaces of a pair of front, finger-like portions of the branches can be pressed against contact surfaces of these lugs. The axial forces can be transferred from the loose top to the basic body either via the shoulder surfaces and co-operating axial support surfaces of the front portions of the branches, or via the rear end of the loose top and the area of the bottom between the branches.

A disadvantage of the known drilling tool is of a manufacturing-technical nature and includes the fact that the requirements of dimensional accuracy are great. Accordingly, the tool design in question requires a fine or narrow fit not only between the co-operating pairs of inner support surfaces of the branches and the external side contact surfaces of the loose top, but also between the co-operating pairs of concave and convex guide surfaces, respectively, which are formed adjacent to the bottom of the jaw, as well as on the rear end of the loose top portion, and which are to be brought into engagement with each other in connection with the turning-in of the loose top into the operative end position. This means that already the initial surface contact between the guide surfaces (before the turning-in of the loose top is started) may give rise to a considerable turning resistance, which thereafter is accentuated when contact between the pairs of inner support surfaces and side contact surfaces is established. In other words, the total manual force that is required to turn in the loose top to the end position thereof can become disadvantageously great. Another disadvantage is that the transfer of torque between the basic body and the loose top is exclusively effected via the comparatively short lugs that protrude rearward from the rear end of the envelope surface of the loose top. In other words, the tangential support surfaces and the tangential contact surfaces become necessarily small and may cause so high a surface pressure that a risk of deformation damage arises, particularly in the front finger portions of the branches. In this connection, it should be borne in mind that drilling tools of the kind in question may have as limited a diameter as about 8 mm, wherein the torque-transferring surfaces in question may become just of millimeter size. A further disadvantage is that the total axial length of the loose top is considerable in relation to the diameter (2:1), more precisely as a consequence of the fact that the front part, along which the envelope surface extends, occupies approximately 50% of the total length, while the remaining 50% is occupied by the rear pin part. This means that the total volume of the loose top in relation to the diameter becomes large and causes expensive consumption of material in the manufacture. Yet another disadvantage is that the pinch or grip of the branches on the loose top is limited to the rear half of the loose top, while the front half of the same lacks lateral support.

The present invention aims at obviating the above-mentioned disadvantages of the drilling tool known by U.S. Pat. No. 6,506,003 and at providing an improved drilling tool. Therefore, an object of the invention is to provide a drilling tool, the loose top of which has a minimal length—and thereby a minimal volume—in relation to its diameter, and that can be made with minimal requirements of dimensional accuracy as well as be mounted in the appurtenant jaw of the basic body in a simple and smooth way. In doing so, it should be possible to hold the loose top coarse-centered in an initial position before turning-in toward its operative end position, without for that reason needing to be formed with a particular centering pin that would be added to the length of the loose top.

Another object is to provide a drilling tool having a loose top that in its entirety is held reliably clamped between the branches of the basic body.

Yet another object of the invention is to provide a drilling tool, the basic body and the loose top of which are formed in such a way that great torques can be transferred between the same without any obvious risk of deformation damage.

Furthermore, the drilling tool should allow quick and simple replacements of the loose top, with a simple key and without the basic body necessarily having to be removed from the driving machine. Important factors in order to ensure smooth replacements are that it should be possible to insert the loose top between the branches without fault, as well as that the branches should present the smallest possible resistance to the turning-in of the loose top into its operative end position, without renounce being made on the ability of the branches to hold the loose top reliably clamped during drilling. The invention also aims at providing a drilling tool that in connection with the mounting of the loose top allows the operator to—in a tactile and/or auditive way—clearly perceive when the loose top reaches its operative end position.

SUMMARY OF THE INVENTION

In an embodiment, the invention provides a drilling tool for chip removing machining, including a basic body and a loose top. The basic body includes front and rear ends, and an envelope surface that includes two countersunk chip flutes and is concentric with a first center axis around which the basic body is rotatable in a given direction of rotation. The loose top includes front and rear ends, a pair of envelope part surfaces concentric with a second center axis, and two chip flutes countersunk in relation to the pair of envelope part surfaces between which two bars project radially from a central core, the front end including a cutting edge and at least one clearance surface positioned rotationally behind the cutting edge, the rear end forming an axial contact surface. The loose top also includes two opposite side contact surfaces, a pair of convex guide surfaces situated axially behind the side contact surfaces, the guide surfaces being concentric with the second center axis and radially spaced-apart from the second center axis at a distance that is less than the radial distance between the second center axis and a respective side contact surface, and a pair of torque-carrying tangential contact surfaces that are situated radially inside the envelope part surfaces and outside the side contact surfaces. The front end of the basic body includes a jaw that is delimited by a bottom axial support surface against which the axial contact surface of the loose top is pressed, and two peripherally situated branches that protrude axially from the bottom axial support surface, the branches being elastically bendable to clamp the loose top in an operative end position in the jaw by a pair of inner support surfaces of the branches being resiliently pressed against the side contact surfaces of the loose top, and a pair of rotationally heading tangential support surfaces of the branches being pressed against the tangential contact surfaces of the loose top, besides which axially behind the inner support surfaces concave guide surfaces are arranged for co-operation with the two convex guide surfaces of the loose top, and the loose top being axially inserted into the jaw of the basic body and turnable to and from an operative end position, in which the tangential support surfaces of the branches are pressed against the tangential contact surfaces of the loose top. The axial contact surface of the loose top extends perpendicular to the second center axis of the loose top between borderlines adjacent to the two envelope part surfaces. A greatest diameter between the pair of concave guide surfaces of the branches is greater than an analogous diameter between the pair of convex guide surfaces of the loose top such that the guide surfaces provisionally hold the loose top in an intermediate position during the turning-in toward the operative end position. The pair of concave guide surfaces of the branches lack contact with the pair of convex guide surfaces of the loose top in the operative end position.

In another embodiment, the invention provides a loose top for drilling tools, including front and rear ends, a pair of envelope part surfaces concentric with a center axis, and two chip flutes countersunk in relation to the pair of envelope part surfaces between which two bars project radially from a central core, the front end including a cutting edge and at least one clearance surface positioned rotationally behind the cutting edge, the rear end forming an axial contact surface. The loose top includes two opposite side contact surfaces against which elastically bendable branches of a tool basic body are pressed in use, a pair of convex guide surfaces situated axially behind the side contact surfaces, the guide surfaces being concentric with the center axis and radially spaced-apart from the center axis at a distance that is less than the radial distance between the center axis and a respective side contact surface, and a pair of torque-carrying tangential contact surfaces that are situated radially inside the envelope part surfaces and outside the side contact surfaces. The axial contact surface extends perpendicular to the center axis between borderlines adjacent to the two envelope part surfaces.

In yet another embodiment, the invention provides a basic body for a drilling tool for chip removing machining, including front and rear ends, and an envelope surface that includes two countersunk chip flutes and is concentric with a center axis around which the basic body is rotatable in a given direction of rotation. A jaw is formed in the front end and delimited by a bottom axial support surface and two peripherally situated branches that protrude axially from the bottom axial support surface, the branches being elastically bendable. Each branch includes an inner support surface, a tangential support surface for the transfer of torque to a loose top, and a concave guide surface concentric with the center axis formed axially behind the inner support surface. The axial support surface extends perpendicular to the center axis between borderlines adjacent to the envelope surface.

The invention is generally based on the idea of utilizing the limited length of an advantageous compact loose top in a way that is optimal for the transfer of torque at the same time as the means, which are required for provisionally centering the loose top in connection with the turning-in into the jaw, can be integrated in the loose top without unnecessarily being added to its total length. In an embodiment, this is effected by allowing the individual tangential contact surface of the loose top to extend from the rear end thereof to the front one and transform into the side contact surface as well as a guide surface via a recess surface common to the same. In such a way, the guide surfaces necessary for the provisional centering do not need to be located axially behind the tangential contact surfaces.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

In the following, a number of co-operating pairs of surfaces of the basic body and the loose top, respectively, will be described. When these surfaces are present on the basic body, the same are denominated "support surfaces", while the corresponding surfaces of the loose top are denominated "contact surfaces" (e.g., "axial support surface" and "axial contact surface", respectively). In order to further distinguish different surfaces from each other, there are in addition used such prefixes as "axial" and "tangential" in the expressions axial support surfaces/axial contact surfaces and tangential support surfaces/tangential contact surfaces, respectively. However, these prefixes do not relate to how the different surfaces are geometrically situated in the tool, but rather to the directions in which they transfer and carry forces, respectively. It should also be pointed out that the loose top includes a rear end that in an embodiment is in the form of a plane surface and serves as an axial contact surface for pressing against an axial support surface in the basic body. Depending on the context, this surface will be denominated either "rear end" or "axial contact surface". In the drawings, the co-operating surfaces contacting each other in the operative state of the drilling tool are shown by similar surface patterns.

Figure 1:
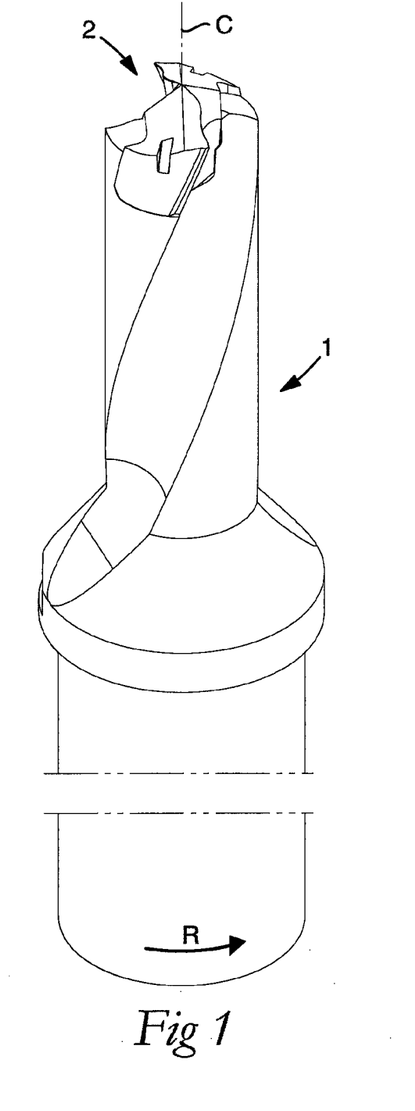
FIG. 1 is a sectioned perspective view of a first embodiment of a drilling tool according to the invention, the basic body and the loose top of the drilling tool being shown in the assembled state.
Figure 2:
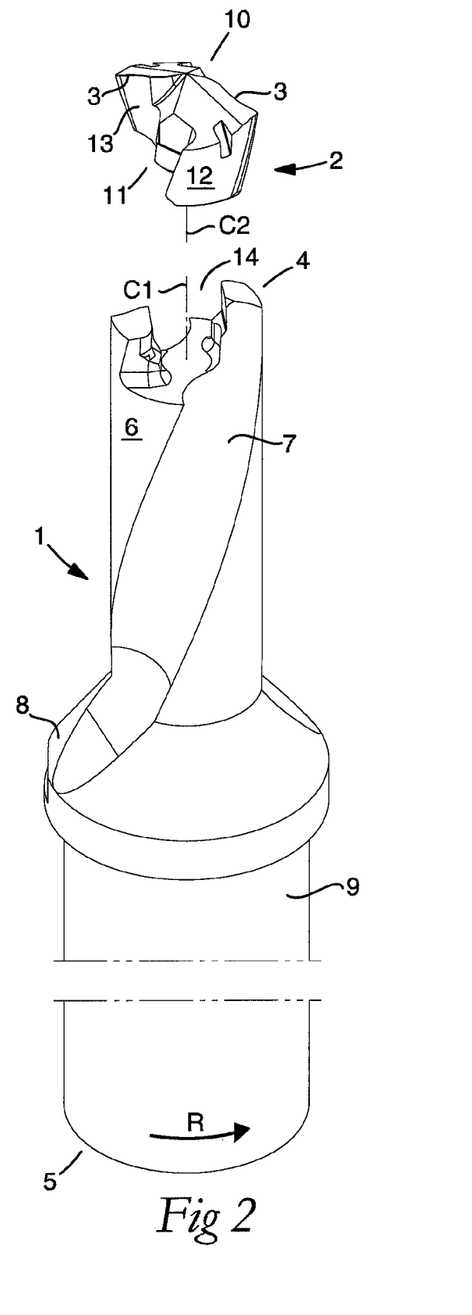
FIG. 2 is an exploded perspective view showing the loose top separated from the basic body.

The drilling tool shown in FIGS. 1 and 2 is in the form of a so-called twist drill and comprises a basic body or drill body 1 as well as a loose top 2 in which cutting edges 3 are included. In its assembled, operative state according to FIG. 1, the drilling tool is rotatable around a center axis indicated by C, more precisely in the direction of rotation R. In FIG. 2, it is seen that the basic body 1 includes front and rear ends 4, 5, between which a center axis C1 specific to the basic body extends. In the backward direction from the front end 4, a cylindrical envelope surface 6 extends, in which two chip flutes 7 are countersunk that in this case are helicoidal, but that could also be straight as in tap borers. In the example, the chip flutes 7 end at a collar 8 included in a rear part 9 that is intended to be attached to a driving machine (not shown).

Also the loose top 2 includes front and rear ends 10, 11 and an own center axis C2 with which two convex part surfaces 12, which together form an envelope surface, are concentric. The two envelope part surfaces 12 are separated by two helicoidal chip flutes 13 (see also FIG. 3), which form extensions of the chip flutes 7 of the basic body 1 when the loose top is mounted onto the basic body. If the loose top 2 is correctly centered in relation to the basic body 1, the individual center axes C1 and C2 coincide with the center axis C of the composed drilling tool.

Because the major part of the basic body 1 lacks interest in connection with the invention, henceforth only the front end portion thereof will be illustrated together with the loose top 2, more precisely on an enlarged scale.

Reference is now made to FIGS. 3-9, FIGS. 3 and 4 of which show how the basic body 1 in the front end thereof includes a jaw 14 that is delimited between two identical branches 15 and an intermediate bottom 16. Each branch 15 includes an inner support surface 17 that in this case is plane and extends axially rearward from a front end surface 18. The surfaces 17, 18 transform into each other via a borderline 19. Furthermore, the individual branch includes a tangential support surface 20 that is facing forward in the direction of rotation R. An opposite, rotationally trailing surface of the branch is included as an axially front part 21a of the concave surface 21 that is present between two helicoidal borderlines 22, 23 and that delimits the chip flute 7. Each branch 15 is elastically bendable in order to be resiliently clampable against the loose top. This bendability or resilience is in practice realized by the fact that the material in at least the front part of the basic body has a certain inherent elasticity, suitably by being of steel. The material in the loose top 2 may in turn, in a traditional way, include cemented carbide (hard carbide particles in a binder metal), cermet, ceramics or the like.

Figure 3:
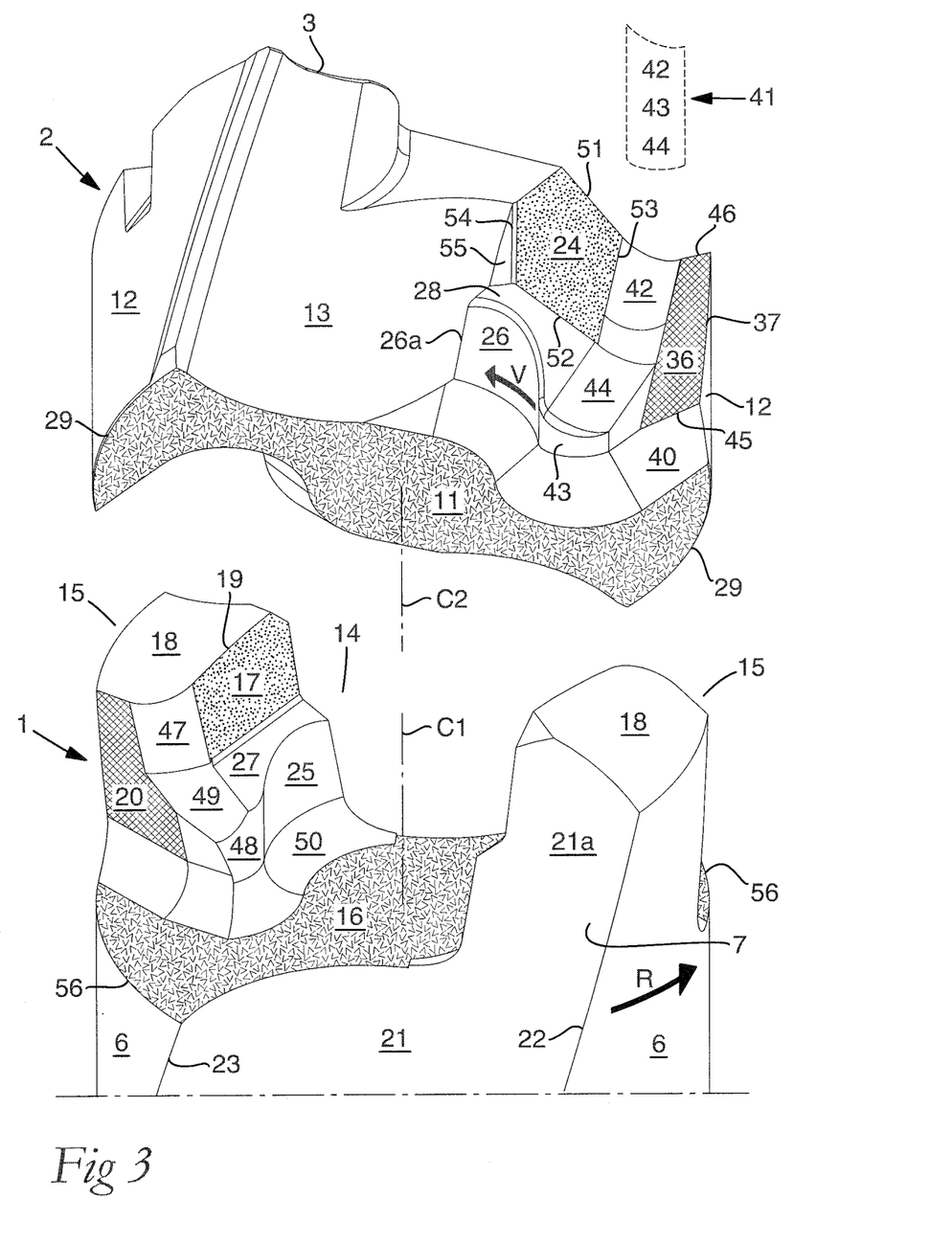
FIG. 3 is an enlarged exploded view showing the loose top in bottom perspective view and the front end of the basic body in top perspective view.

The inner support surfaces 17 of the branches 15 are arranged to be pressed against side contact surfaces 24 of the loose top 2. Axially behind the inner support surfaces 17, a pair of concave guide surfaces 25 are formed, which are arranged to co-operate with convex guide surfaces 26 situated axially behind the side contact surfaces 24 of the loose top. The individual inner support surface 17 transforms into the concave guide surface 25 via a transition surface 27. In an analogous way, the surfaces 24 and 26 transform into each other via a transition surface 28.

A fundamental idea behind the drilling tool according to the embodiment is that the guide surfaces 25, 26 should only co-operate with each other temporarily, viz. during the initial turning-in of the loose top toward the operative end position.

In the shown, preferred embodiment, both the concave guide surfaces 25 and the convex guide surfaces 26 are cylindrical and concentric with the respective center axes C1, C2. They could also have another rotationally symmetrical basic shape, e.g., a conical one, or be composed (individually or simultaneously) of a cylindrical part surface as well as a conical one.

Figure 5:
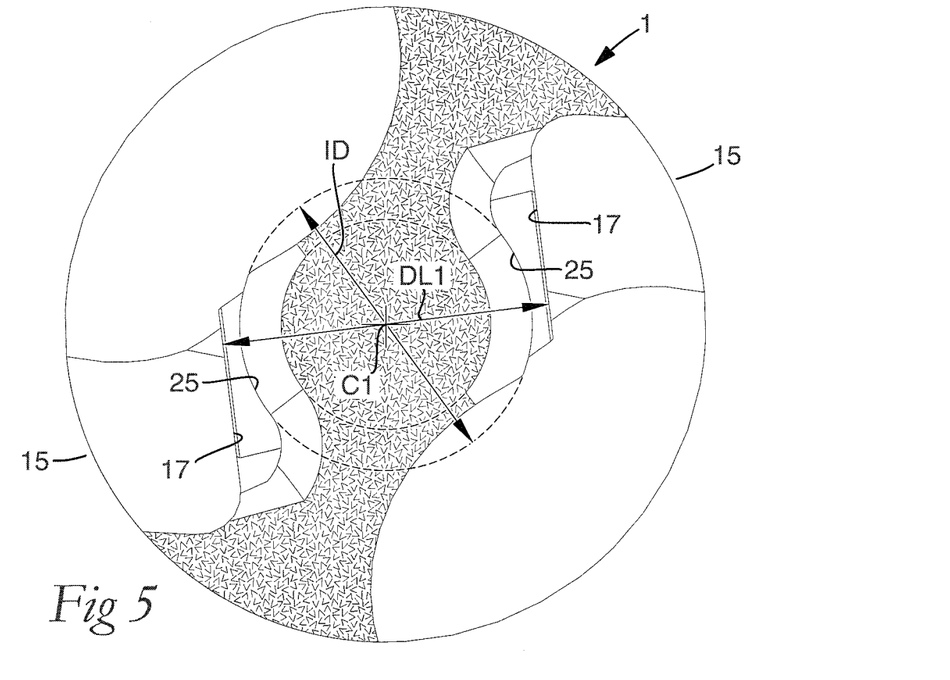
FIG. 5 is an end view V-V in FIG. 4 showing the basic body from the front.
Figure 6:
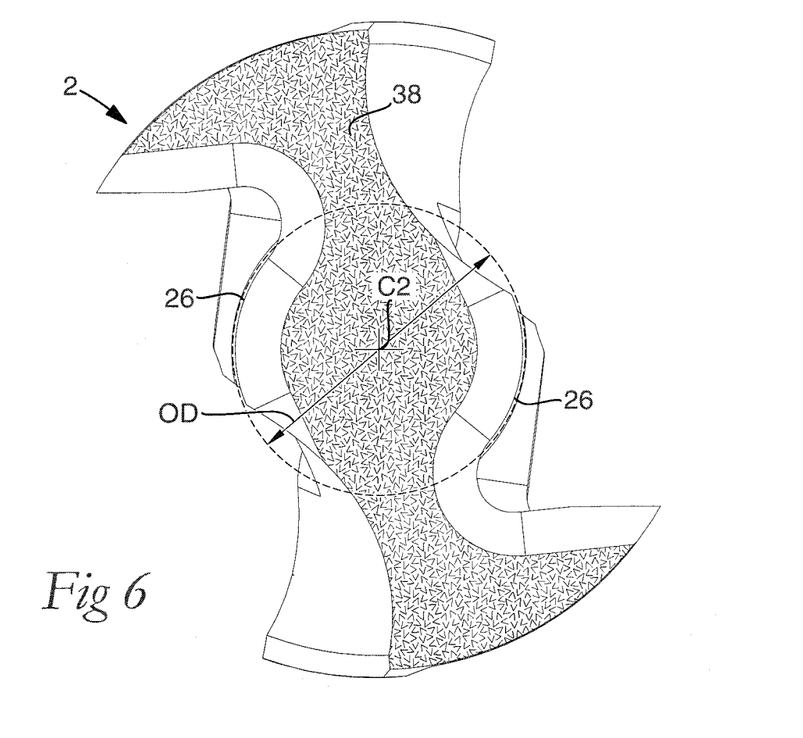
FIG. 6 is an end view VI-VI in FIG. 4 showing the loose top from behind.

In FIGS. 5 and 6, ID designates an inner diameter or a diametrical dimension between the two concave guide surfaces 25, while OD designates an outer diameter or a diametrical dimension between the convex guide surfaces 26. According to the embodiment, the inner diameter ID is somewhat greater than the outer diameter OD. In practice, the difference between ID and OD may be minimal and amount to one or a few tenths of a millimeter. Nonetheless, the difference is sufficiently great in order for the guide surfaces 25, 26, on one hand, to clear each other when the loose top has been turned into its operative end position, but, on the other hand, to ensure that the loose top is held provisionally centered, i.e., located in an intermediate position between the branches, when the turning-in is to be started.

As is seen in FIG. 3, the rear end of the loose top is represented by a plane surface 11 that extends perpendicular to the center axis C2 in order to serve as an axial contact surface, which is pressable against the bottom 16 that is situated in the jaw 14 of the basic body and serves as an axial support surface. The surface 11 extends diametrically between two convex borderlines 29 that in the example form direct transitions to the envelope part surfaces 12, the surface 11 having a §-like contour shape.

The front end 10 of the loose top 2, in which the cutting edges 3 are included, is represented by an end surface that is composed of a plurality of part surfaces (see FIGS. 4 and 8), which in this case are identical in pairs and therefore not described individually. Behind the individual cutting edge 3 (as viewed in the direction of rotation), a primary clearance surface 30 is formed, which has a moderate clearance angle and transforms into a secondary clearance surface 31 having a greater clearance angle. The surface 31 transforms in turn into a third clearance surface 32 that has an even greater clearance angle and forms a transition to a chip flute 13 being behind. In the vicinity of the cutting edge 3, the concave limiting surface of the chip flute 13 forms a chip surface that closer to the center of the loose top transforms into a convex part surface 33. Furthermore, it should be noted that, adjacent to the envelope part surface 12, a guide pad 34 is formed, the main task of which is to guide the drilling tool. The diameter of the drilled hole is determined by the diametrical distance between the peripheral points 3a, in which the cutting edges 3 meet the guide pads 34. It should also be pointed out that the two cutting edges 3 converge into a tip 35, which forms the very foremost part of the loose top, and in which there may be included a so-called chisel edge and a minimal centering punch that is not visible to the naked eye.

Figure 4:
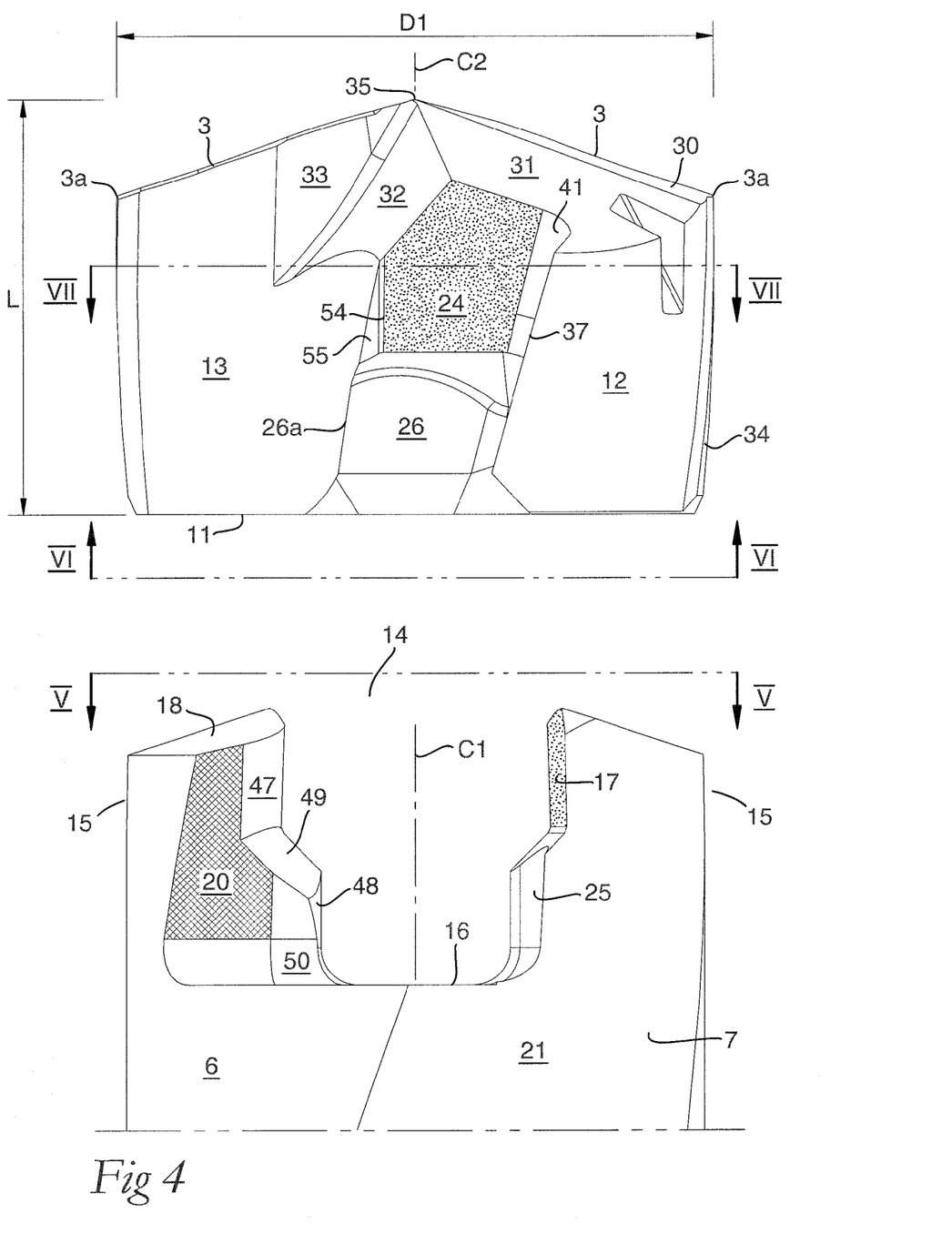
FIG. 4 is an exploded view showing the basic body and the loose top in side view.

In FIG. 4, D1 designates the diameter of the loose top (equal to the diameter of the drilled hole), while L designates the total length of the loose top between the tip 35 and the axial contact surface 11. In the shown, preferred embodiment, the length L is considerably smaller than the diameter D. More precisely, L amounts to approx. 70% of D. This means that the loose top is extraordinarily compact in relation to its diameter, involving that the material consumption in the same is minimized.

Figure 7:
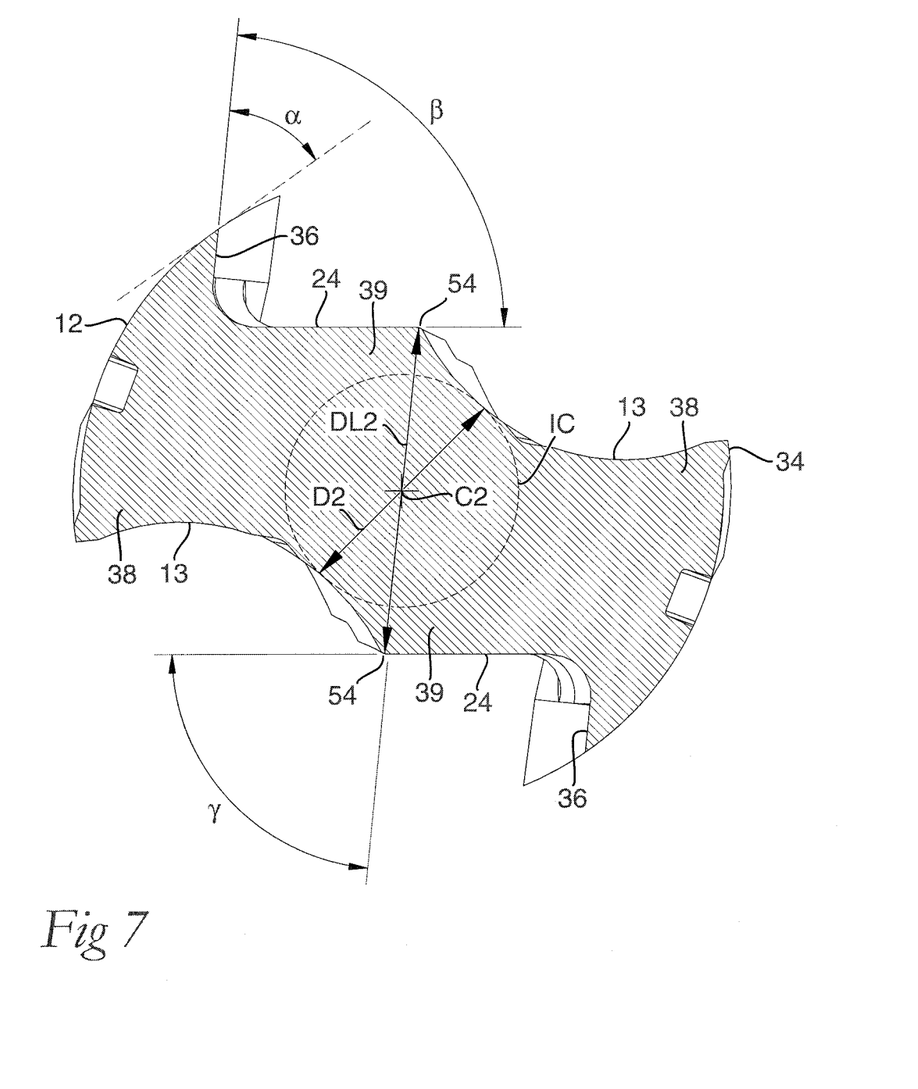
FIG. 7 is a cross section VII-VII in FIG. 4.

Inward from each envelope part surface 12, a torque-carrying tangential contact surface 36 (see FIGS. 3 and 7) extends, which meets the envelope part surface 12 along a borderline 37. Accordingly, the tangential contact surface 36 is situated radially inside the envelope part surface 12, but radially outside the side contact surface 24. As is seen in FIG. 7, the surfaces 12, 36 converge toward each other at an acute angle of convergence α, which in the example amounts to approx. 50°. Also the angle β between the tangential contact surface 36 and the side support surface 24, which is plane in the example, is acute, although considerably greater than α. In the example, β amounts to approx. 86°.

In FIG. 7, IC furthermore designates the so-called core of the loose top, which is constituted by an inscribed circle between the portions of the concave chip flute surfaces 13 positioned closest to each other. Radially outward from the core, two bars 38 extend, which generally are delimited between the surfaces 13, 12, 36 and 24. As is seen in FIGS. 3 and 7, the individual side contact surface 24 is, in the shown, preferred embodiment, plane and spaced-apart from the core IC by the existence of a web or material portion 39 having a certain thickness. In other words, the side contact surface 24 may be said to be included in a material add-on portion on the outside of the core IC. Furthermore, it should be pointed out that the two side contact surfaces 24 are parallel to each other when the loose top is regarded in cross-section (see FIG. 7).

The individual tangential contact surface 36 (see FIG. 3) extends (with the exception of a minor, S-shaped transition or clearance surface 40) from the rear end 11 of the loose top to the front one 10. Inside the tangential contact surface 36, there is a concave recess surface in its entirety symbolically designated 41, which includes a plurality of concave part surfaces, viz. a front part surface 42 that borders on the side contact surface 24, and a rear part surface 43 that borders on the convex guide surface 26. Between the two part surfaces 42 and 43, a third, concave part surface 44 is formed that forms a radial transition between the tangential contact surface 36 and the transition surface 28 between the surfaces 24 and 26. In the shown, preferred embodiment, the tangential contact surface 36 extends all the way from the rear end or axial contact surface 11 of the loose top up to the front end 10. More precisely, the surface 36 extends between a rear borderline 45 and a front borderline 46, the last-mentioned one of which forms a transition between the surface 36 and the clearance surface 31 included in the front end of the loose top (cf. FIG. 8). From the above, it is seen that the axial length of the tangential contact surface 36 (between the borderlines 45, 46) is essentially as great as the sum of the axial length or extension of the surfaces 24, 26 and 28. In other words, the tangential contact surface 36 is considerably longer than the side contact surface 24. For this reason, the axial extension of the compact loose top is utilized to provide an optimally large tangential contact surface 36.

As is further seen in FIG. 3, there is a first, convex part surface 47 between the inner support surface 17 and the tangential support surface 20 of the individual branch. Similar, convex part surfaces 48, 49 are present also between the concave guide surface 25 and the tangential support surface 20 and between the transition surface 27 and the tangential support surface 20. The part surfaces 47, 48, 49 form clearance surfaces that generally have a greater radius of curvature than the corresponding, concave part or clearance surfaces 42, 43, 44 of the loose top. In such a way, clearances between the pairs of part surfaces are formed when the loose top assumes its operative end position in the jaw 14. In the same end position, also the concave transition surface 50 adjacent to the axial support surface 16 clears from the convex transition surface 40 adjacent to the axial contact surface 11.

With continued reference to FIG. 3, it should further be pointed out that the individual side contact surface 24 extends axially rearward from the front end of the loose top. More precisely, the surface 24 is axially delimited between front and rear borderlines 51, 52, the front one of which forms a transition to the clearance surface 31 (see also FIG. 8). Laterally, the surface 24 is delimited by rotationally heading and trailing, respectively, side borderlines 53, 54, the last-mentioned one of which forms or is included in a limiting edge adjacent to a triangular intermediate surface 55. In the example, the limiting edge 54 is straight.

Like the axial contact surface 11, the axial support surface 16 extends between two diametrically opposed, arched borderlines 56. Advantageously, the two surfaces 11 and 16 have an identical, §-like contour shape, the same getting complete surface contact with each other when the loose top assumes its operative end position.

Reference is now made to FIGS. 5-7, in which DL1 (see FIG. 5) designates an imaginary first diametrical line that extends the shortest possible distance between the plane and mutually parallel inner support surfaces 17 of the branches, when the same are unloaded. In other words, the diametrical line DL1 extends perpendicular to the respective inner support surface. It is axiomatic that any other, arbitrary diametrical line (i.e., a straight line through the center axis C1) that extends between the inner support surfaces 17 will become longer than the diametrical line DL1. This applies irrespective of whether the imaginary line is turned clockwise or counterclockwise around the center axis C1.

In FIG. 7, DL2 designates a second, imaginary diametrical line that extends between the limiting edges 54 of the two side contact surfaces 24. The diametrical line DL2 is somewhat longer than the diametrical line DL1. In practice, the length difference between DL1 and DL2 may only amount to one or a few hundredths of a millimeter and, for instance, be in the range of 0.02-0.10 mm. In addition, it should be noted that the diametrical line DL2 between the limiting edges 54 of the loose top forms an acute angle γ with the respective side contact surface 24. In the example, this angle γ amounts to approx 85°.

Figure 8:
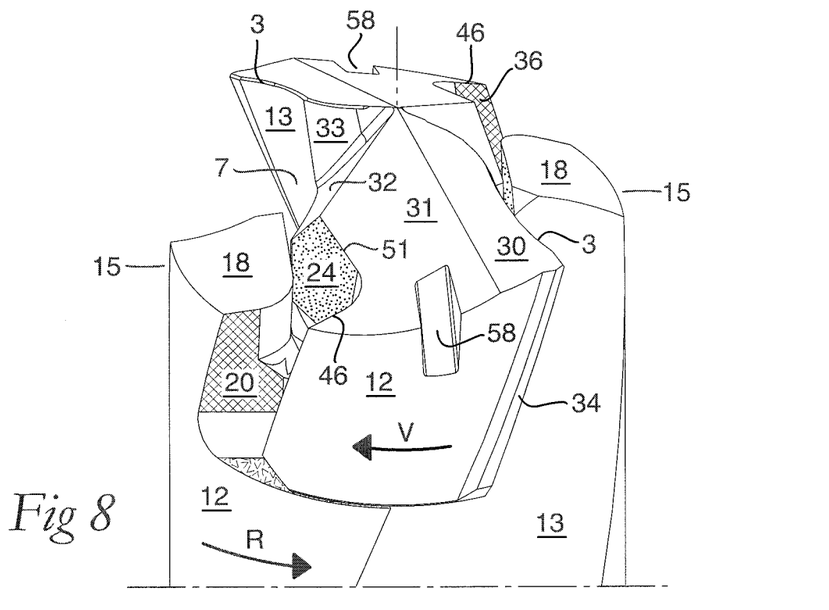
FIG. 8 is a partial perspective view showing the loose top inserted into the jaw of the basic body in a state when the turning-in of the same toward an operative end position is to be started.

In FIG. 8, V designates the direction in which the loose top 2 is turned to reach its operative end position. The turning direction V is opposite the direction of rotation R of the drilling tool.

As may be best seen in FIG. 3, the guide surface 26 is partially displaced in the tangential direction in relation to the side contact surface 24, more precisely in such a way that the borderline 26a to the chip flute 13 is displaced rearward in relation to the direction of rotation R relative to the limiting edge 54 of the side contact surface 24, i.e., toward the left in FIG. 3. During the turning-in of the loose top in the turning direction V, the borderline 26a will therefore move ahead the limiting edge 54. The practical consequence of this will be that the guide surfaces 26 can start to co-operate with the guide surfaces 25 with the purpose of provisionally coarse-centering the loose top already before the limiting edges 54 get in contact with the inner support surfaces 17 of the branches 15. In other words, the loose top cannot be pushed laterally out of the jaw 14, as soon as the axial contact surface 11 thereof has been pressed against the axial support surface 16.

It should be noted that the two concave guide surfaces 25 in the rear part of the jaw 14 are formed on border portions that are thickened inward in relation to the rest of the branches 15. As a consequence of this, the individual tangential contact surface 20 (see FIG. 3) becomes essentially L-shaped, when the same is ground. Instead of being uniform in width, accordingly the tangential support surface 20 becomes wider along the rear, thickened border portion of the branch 15 than along the front portion of the same. An advantage of the thickened border portion is that the branch in its entirety becomes very robust and can transfer great tangential forces without being deformed. Here, it should be particularly observed that the bendability or elastic resilience, which is required in order for the branch to be bendable and capable of subjecting the loose top to a clamping force, can be concentrated to the front half of the branch because the clamping occurs along the side contact surface 24 that is located at the front half of the loose top 2, while the rear half of the branch 15 may be essentially non-resilient.

In FIG. 8, the loose top 2 is shown in an initial position, in which the same has been inserted axially into the jaw between the branches 15 of the basic body, however, without having been turned into its operative end position. Already in this initial position, the convex guide surfaces 26 have been inserted partially between the concave guide surfaces 25 of the insides of the branches 15. In such a way, it is ensured that the loose top is coarse-centered in relation to the jaw, i.e., is held in an intermediate position between the branches (without because of this be exactly centered in relation to the center axis C1 of the basic body) already before the limiting edges 54 of the side contact surfaces 24 get in contact with the inner support surfaces 17 of the branches 15. When the turning-in has started, the limiting edges 54 of the two side contact surfaces 24 will in due course contact the inner support surfaces 17 and bend out the branches while applying a tension or spring force to the same, more precisely due to the length difference between DL1 and DL2. Precisely when the two the diametrical lines DL1 and DL2 coincide with each other, the loose top passes a dead position, in which the spring force in the branches is maximal, whereupon the loose top is turned a short distance further until the tangential contact surfaces 36 are pressed against the tangential support surfaces 20 of the branches. In this position, when the loose top assumes its operative end position, the spring force has been reduced somewhat in relation to its maximal value in the dead position, however, without having faded away. In other words, in the operative end position, the spring force is still sufficient in order to reliably and securely pinch the loose top between the branches. During the final phase of the turning-in, i.e., the short arc length between the dead position and the end position, the operator perceives that the loose top reaches the intended end position, either in a tactile way in the fingers or by an audible click sound (or a combination of both these manifestations).

Figure 9:
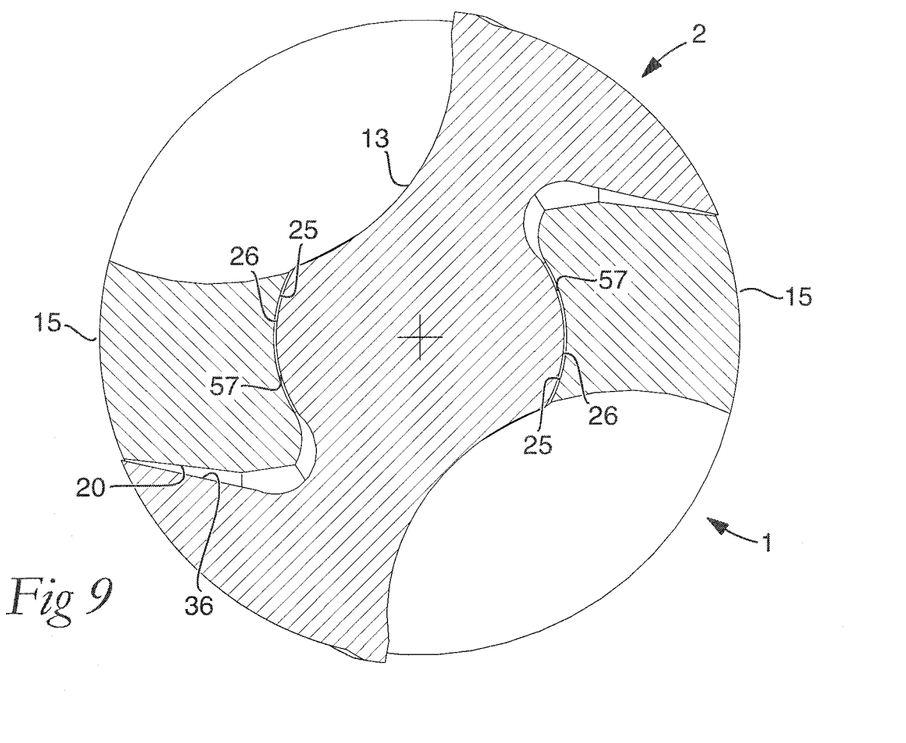
FIG. 9 is a cross section showing how two pairs of guide surfaces co-operate with each other.

In FIG. 9, it is seen that arched slits 57 arise between the pairs of guide surfaces 25, 26 when the loose top assumes its operative end position, more precisely as a consequence of the aforementioned difference in diameter between OD and ID.

Dismounting of the loose top is carried out by turning the same in the direction opposite the turning-in direction V. In mounting as well as dismounting, the requisite torque can be applied by a key (not shown) that is brought to engage notches 58 in the transitions between a clearance surface 31 and an envelope part surface 12 (see FIG. 8).

A fundamental advantage of the invention is that the tool and in particular the loose top manufactured in large series, can be produced without insurmountable requirements of dimensional accuracy, more precisely by the fact that the number of surfaces that needs to be precision machined, e.g., by grinding, is reduced to a minimum. The surfaces of the loose top according to the embodiment, that require precision machining in order to ensure good clamping and good centering of the loose top, are easy to access and include only the pairs of side contact surfaces and tangential contact surfaces, while the guide surfaces, however, do not need to be precision machined, because the same are only temporary active in connection with the turning-in of the loose top being initiated. However, in the operative end position of the loose top, the co-operating pairs of convex and concave guide surfaces lack contact with each other. Another advantage of the invention is that the loose top can be formed with ample tangential contact surfaces in spite of the fact that the loose top is compact and short in comparison with the loose top known by U.S. Pat. No. 6,506,003 B1. In such a way, relatively great torques can be transferred from the branches of the basic body to the loose top without risk of deformation damage. The fact that the rear portions of the branches are thickened and robust also contributes thereto. Furthermore, the loose top can be mounted in a rapid and convenient way because the spring force that has to be overcome in order to bring the loose top to the end position only occurs instantaneously during a short moment and not uniformly during the turning-in in its entirety. It is also an advantage that the pinch between the branches and the loose top is established along the axially front part of the loose top rather than against the rear one. Accordingly, the two side contact surfaces, against which the branches are clamped, are located in the immediate vicinity of the clearance surfaces included in the front end.

Figure 10:
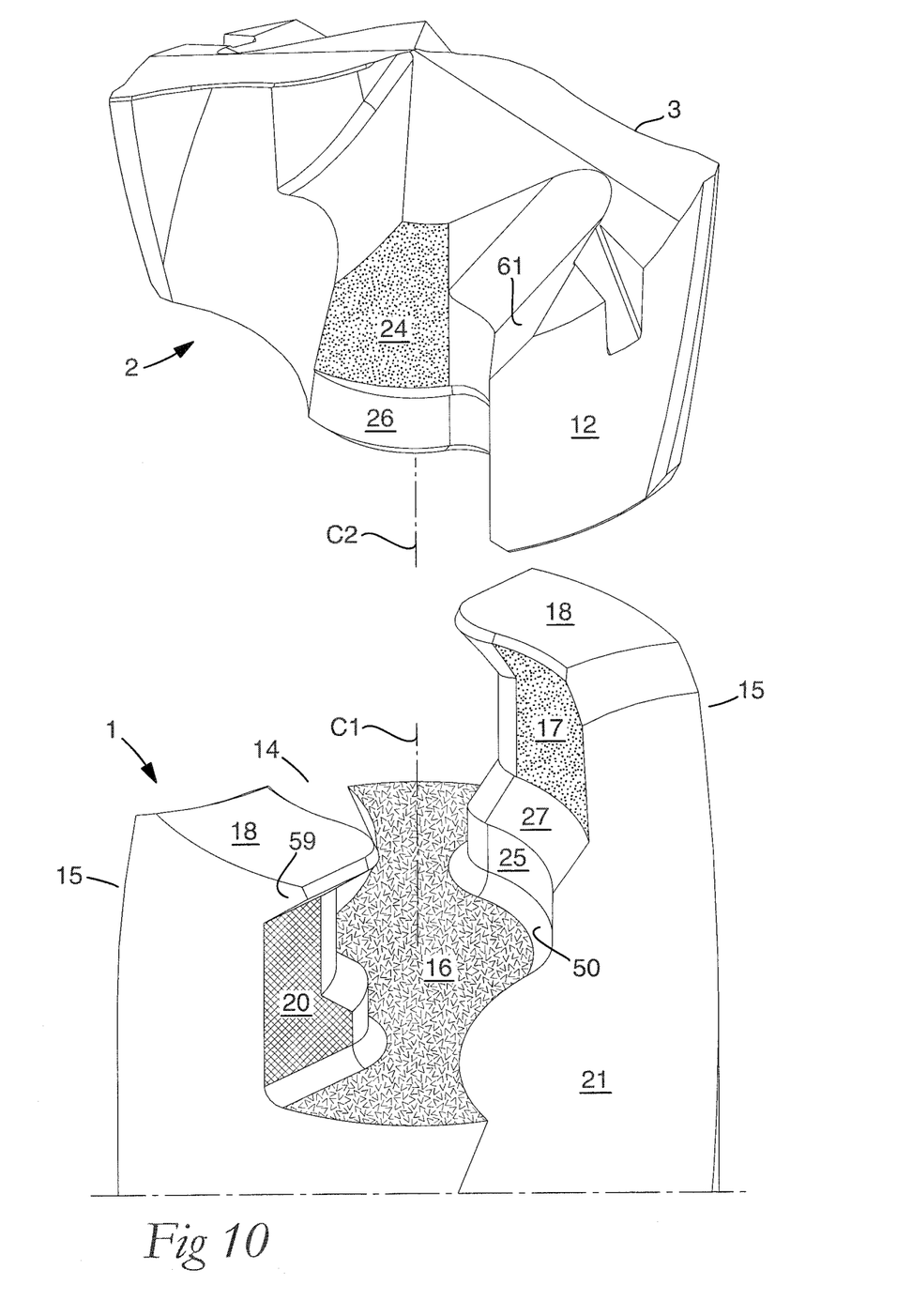
FIG. 10 is a perspective exploded view showing a basic body and a loose top of an alternative embodiment of a drilling tool according to the invention, more precisely in top perspective view.
Figure 11:
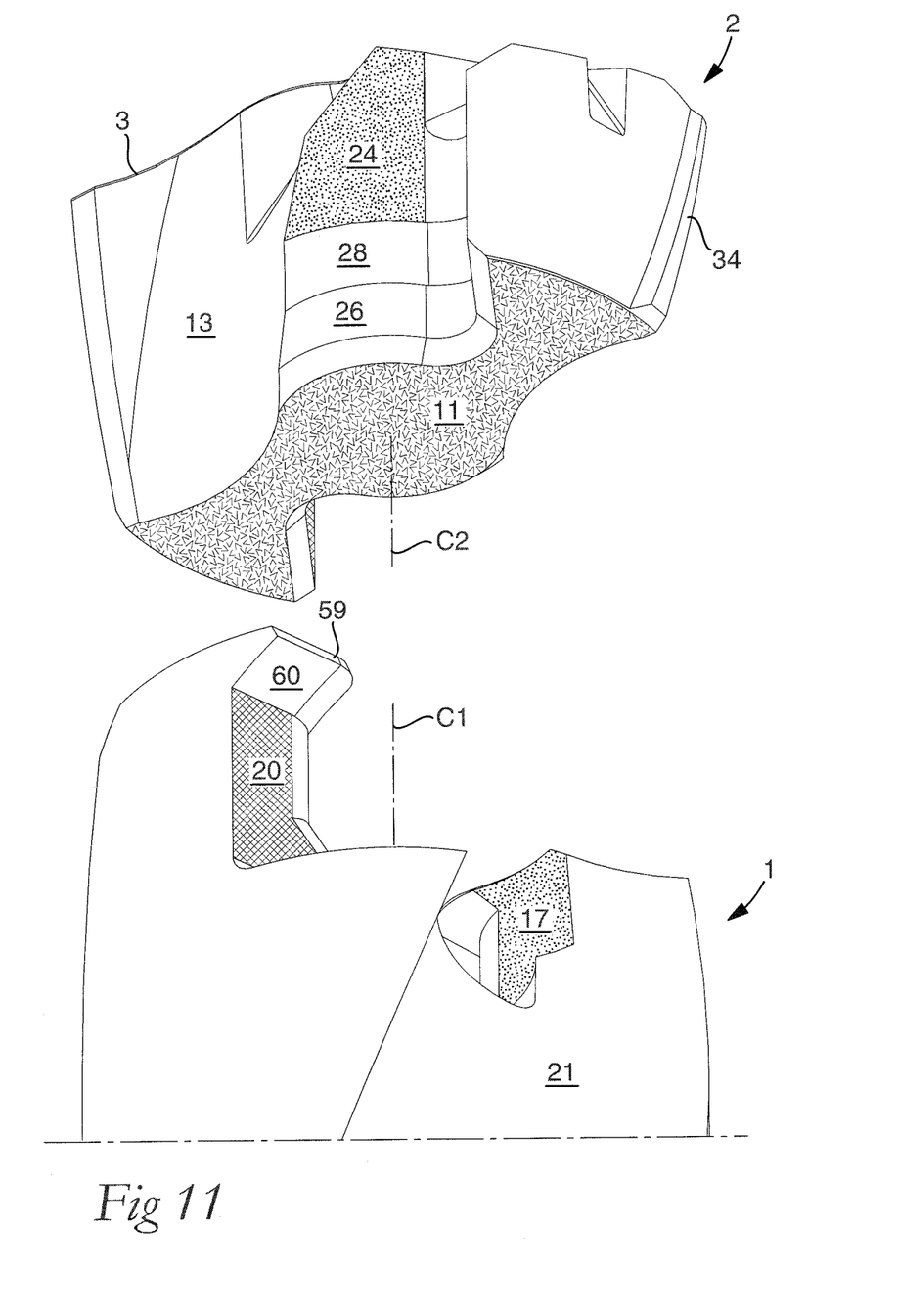
FIG. 11 is an exploded view showing the same basic body and loose top in bottom perspective view.

Reference is now made to FIGS. 10 and 11, which illustrate an alternative embodiment that differs from the previously described embodiment in that, among other things, the side contact surfaces 24 of the loose top 2 are convex and the inner support surfaces 17 of the branches 15 concave, and not plane. Furthermore, the free, front ends of the branches 15 are formed with brackets or lips 59 that project radially forward in the direction of rotation from the tangential support surfaces 20 being axially behind. The last-mentioned ones run in this case essentially parallel to the center axis C1 of the basic body. The lips 59 form lock means that counteract unintentional breaking away of the loose top out of the jaw 14, e.g., in connection with the drilling tool being to be pulled out of a drilled hole. The individual lip 59 is wedge-shaped and has a rearwardly directed, inclined stop surface 60, which is facing a likewise inclined surface 61 included in the front end of the loose top. However, these surfaces 60, 61 are not in contact with each other as long as the loose top is securely pinched by a spring force that is sufficiently great to prevent breaking away. However, if the forces that aim to break away the loose top overcome the spring force in the branches, the surfaces 61 will be pressed against the stop surfaces 60 and prevent further axial movement of the loose top. In this connection, it should be mentioned that the drilling tool during retraction out of the drilled hole still is brought to rotate in the direction of rotation R. In such a way, the tangential support surfaces 20 are held continuously in contact with the tangential contact surfaces 36 behind the lip 59, and therefore the lips 59 prevent breaking away in a foolproof way.

An analogous, axial locking of the loose top 2 is ensured in the embodiment according to FIGS. 1-9 by the co-operating tangential support surfaces 20 and the tangential contact surfaces 36 being inclined (see FIG. 8 and the borderline 37 in FIG. 4) in such a way that an arbitrary front contact point between the surfaces are rotationally heading in relation to each contact point being behind. When the individual tangential support surface 20 is held pressed against the appurtenant tangential contact surface 36 during retraction and simultaneous rotation of the drilling tool, the loose top is therefore subjected to a force that aims to press the axial contact surface 11 of the loose top against the axial support surface 16 and that, by virtue of this, efficiently counteracts unintentional axial pulling out of the loose top.

Figure 12:
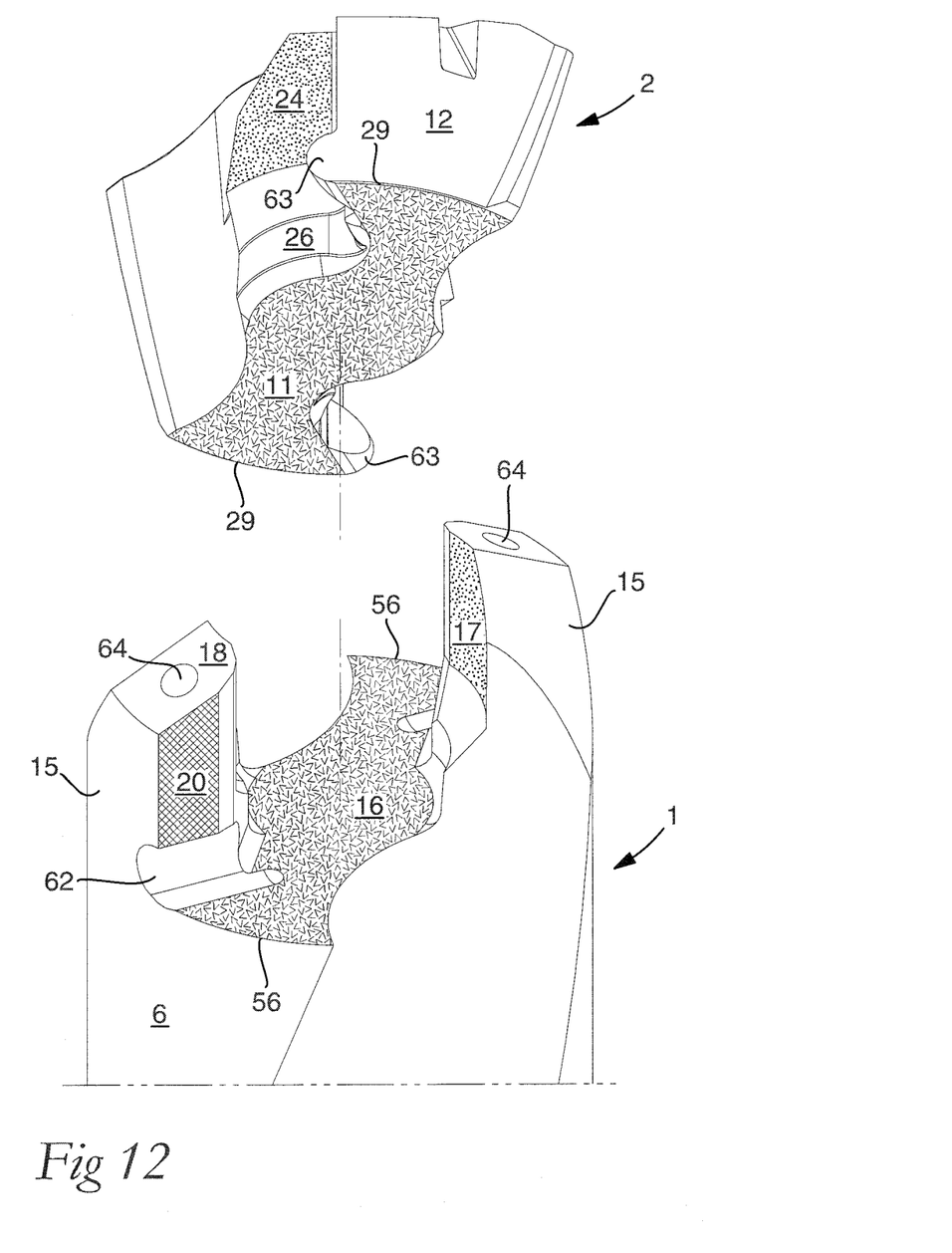
FIG. 12 is a perspective exploded view showing an additional embodiment, the loose top of the tool being shown in bottom perspective view.
Figure 13:
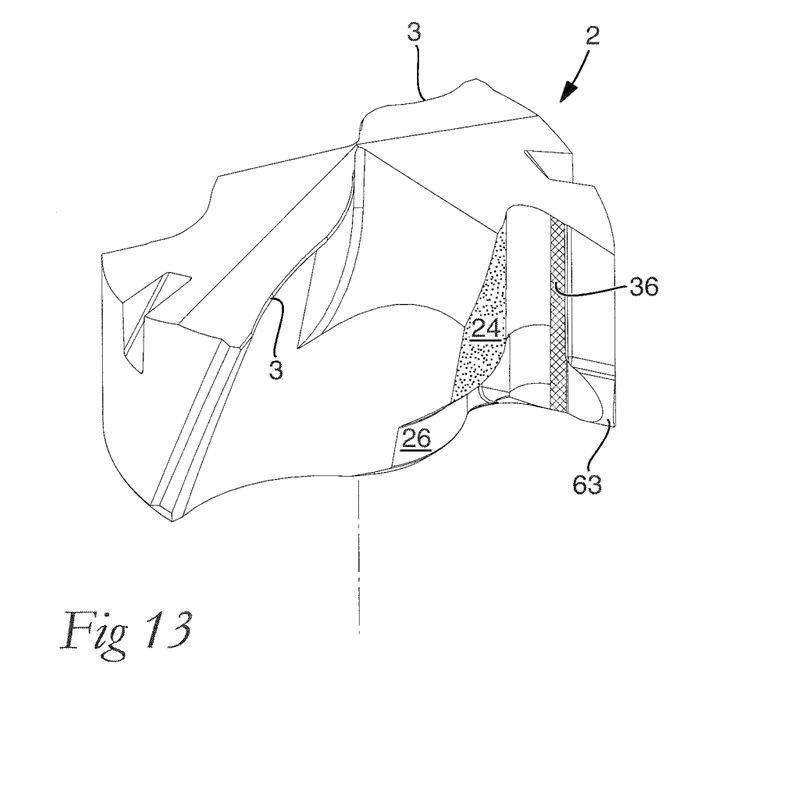
FIG. 13 is a top perspective view of the loose top according to FIG. 12.

In FIGS. 12 and 13 an additional embodiment is illustrated having another type of means for the axial locking of the loose top. In this case, the lock means includes seats 62 formed in the rear ends of the branches 15, as well as two lock members 63 on the loose top. The individual seat 62 is a chute that is recessed in the individual branch 15 and situated between the tangential support surface 20 of the branch and the axial support surface 16 of the basic body. The individual male member 63 is in turn a ridge that is situated axially behind the tangential contact surface 36 of the loose top and connects to the axial contact surface 11. In other words, the ridge 63 projects laterally in relation to the tangential contact surface 36, the rear part thereof transforming into the axial contact surface 11. When the loose top is turned into its operative position, the ridges 63 engage the chutes 62, however without the ridges getting surface contact with the chutes. In the same way as in the previously described embodiment, the ridges 63 will be activated only if the negative axial forces on the loose top overcome the spring force in the branches.

In FIG. 12, it is, in addition, indicated how the basic body 1 may include cooling liquid ducts 64 for the cooling of the cutting edges of the loose top and surfaces connected thereto (applies also to the other embodiments). The cooling liquid ducts 64 mouth in the front end surfaces 18 of the branches 15.

The invention is not limited only to the embodiments described above and shown in the drawings. Accordingly, the axial contact surface of the loose top and/or the axial support surface of the basic body may, for instance, be modified by being composed of two or more mutually separated part surfaces that are situated in a common plane. However, a continuous, plane surface of the type that is exemplified in the drawings is preferred. Although the axial contact surface in the embodiments directly transforms into the envelope part surfaces via the two diametrically opposed end borderlines, between the individual end borderline and the envelope part surface, there may also be a narrow transition surface. Neither is it necessary that the tangential contact surfaces of the loose top extend all the way from the rear end or axial contact surface of the loose top up to the front end. When the requirements of transfer of tangential forces or torques are great, the exemplified embodiment is, however, preferred. As regards the co-operating pairs of guide surfaces, it is possible to form only one of the types, e.g., the concave guide surfaces, with a genuinely cylindrical and/or conical basic shape, while the other type may be formed with one or more part surfaces that are situated at equally large radial distances from a center axis. As has been made clear through the alternative embodiments that have been exemplified, the invention is applicable irrespective of whether the inner support surfaces of the branches and the side contact surfaces of the loose top are plane or arched. In this connection, it should be pointed out that the axial contact surface of the loose top can be either directly pressed or precision machined, e.g., ground. Here, it should also be pointed out that the support surfaces that are included in the jaw of the basic body and that co-operate with the surfaces of the loose top usually obtain a good precision already in connection with the same being formed by chip removing machining. In other words, in the normal case, these surfaces require no finishing. Furthermore, behind the individual cutting edge of the loose top, there may be formed only one clearance surface instead of several ones. In conclusion, it should be said that the drilling tool in question—like other, arbitrary drilling tools—can be used either by being rotated and machining an immovable workpiece, or by being clamped and machining a rotating workpiece.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A drilling tool for chip removing machining, comprising:
   a basic body, including:
      front and rear ends, and an envelope surface that includes two countersunk chip flutes and is concentric with a first center axis around which the basic body is rotatable in a given direction of rotation; and
   a loose top, including:
      front and rear ends, a pair of envelope part surfaces concentric with a second center axis, and two chip flutes countersunk in relation to the pair of envelope part surfaces between which two bars project radially from a central core, the front end including a cutting edge and at least one clearance surface positioned rotationally behind the cutting edge, the rear end forming an axial contact surface;
   two opposite side contact surfaces;
   a pair of convex guide surfaces situated axially behind the side contact surfaces, the guide surfaces being concentric with the second center axis and radially spaced-apart from the second center axis at a distance that is less than the radial distance between the second center axis and a respective side contact surface; and
   a pair of torque-carrying tangential contact surfaces that are situated radially inside the envelope part surfaces and outside the side contact surfaces,
   wherein the front end of the basic body includes a jaw that is delimited by a bottom axial support surface against which the axial contact surface of the loose top is pressed, and two peripherally situated branches that protrude axially from the bottom axial support surface, the branches being elastically bendable to clamp the loose top in an operative end position in the jaw by a pair of inner support surfaces of the branches being resiliently pressed against the side contact surfaces of the loose top, and a pair of rotationally heading tangential support surfaces of the branches being pressed against the tangential contact surfaces of the loose top, besides which axially behind the inner support surfaces concave guide surfaces are arranged for co-operation with the two convex guide surfaces of the loose top, and the loose top being axially inserted into the jaw of the basic body and turnable to and from an operative end position, in which the tangential support surfaces of the branches are pressed against the tangential contact surfaces of the loose top, and
   wherein
      the axial contact surface of the loose top extends perpendicular to the second center axis of the loose top between borderlines adjacent to the two envelope part surfaces,
      a greatest diameter between the pair of concave guide surfaces of the branches is greater than an analogous diameter between the pair of convex guide surfaces of the loose top such that the guide surfaces provisionally hold the loose top in an intermediate position during the turning-in toward the operative end position, and
      the pair of concave guide surfaces of the branches lack contact with the pair of convex guide surfaces of the loose top in the operative end position.

2. The drilling tool according to claim 1, wherein each tangential contact surface of the loose top extends from the axial contact surface of the loose top toward the front end and transforms into a respective side contact surface and a respective guide surface via a recess surface, and the tangential support surface of each branch includes an axial extension that is greater than the axial extension of the inner support surface of each branch.

3. The drilling tool according to claim 1, wherein the each tangential contact surface of the loose top extends from the axial contact surface to a clearance surface included in the front end of the loose top.

4. The drilling tool according to claim 1, wherein the axial support surface of the basic body extends perpendicular to the center axis of the basic body between opposite borderlines toward the envelope surface of the basic body.

5. The drilling tool according to claim 4, wherein the axial support surface of the basic body and the axial contact surface of the loose top have an identical contour shape.

6. The drilling tool according to claim 1, wherein the two concave guide surfaces of the branches are cylindrical and/or conical.

7. The drilling tool according to claim 1, wherein the two convex guide surfaces of the loose top are cylindrical and/or conical.

8. The drilling tool according to claim 1, wherein an imaginary first diametrical line that extends the shortest possible distance between the inner support surfaces of the branches, when the branches are unloaded, has a length that is less than the length of an analogous, second diametrical line between a pair of diametrically opposed limiting edges along the side contact surfaces of the loose top.

9. The drilling tool according to claim 8, wherein the inner support surfaces of the branches and the side contact surfaces of the loose top are plane, the limiting edges being straight.

10. The drilling tool according to claim 1, wherein each tangential contact surface of the loose top and the externally situated envelope part surface converge at an acute angle of convergence (a) toward each other.

11. The drilling tool according to claim 1, wherein the loose top has a diameter that is greater than the axial length of the loose top.

12. The drilling tool according to claim 1, wherein the basic body and the loose top comprise co-operating lock means to prevent unintentional axial retraction of the loose top out of the jaw.

13. The drilling tool according to claim 12, wherein the lock means includes a seat, which is recessed in the rear end of a branch and into which a male member situated adjacent to the axial contact surface of the loose top is insertable.

14. The drilling tool according to claim 13, wherein the seat is a chute situated behind the tangential support surface of the branch, and the male member is a ridge situated behind a tangential contact surface of the loose top.

15. The drilling tool according to claim 1, wherein the axial contact surface is planar and the bottom axial support surface is planar and wherein the axial contact surface mates with the bottom axial support surface in complete surface contact.

16. A loose top for drilling tools, comprising:
   front and rear ends, a pair of envelope part surfaces concentric with a center axis, and two chip flutes countersunk in relation to the pair of envelope part surfaces between which two bars project radially from a central core, the front end including a cutting edge and at least one clearance surface positioned rotationally behind the cutting edge, the rear end forming an axial contact surface;

two opposite side contact surfaces against which elastically bendable branches of a tool basic body are pressed in use;
a pair of convex guide surfaces situated axially behind the side contact surfaces, the guide surfaces being concentric with the center axis and radially spaced-apart from the center axis at a distance that is less than the radial distance between the center axis and a respective side contact surface; and
a pair of torque-carrying tangential contact surfaces that are situated radially inside the envelope part surfaces and outside the side contact surfaces,
wherein the axial contact surface extends in a plane perpendicular to the center axis and between borderlines adjacent to the two envelope part surfaces and extends radially outward of the convex guide surfaces, and
wherein an entire axial length of the loose top is between a tip at the front end and the axial contact surface.

17. The loose top according to claim 16, wherein each tangential contact surface extends from the axial contact surface toward the front end of the loose top and transforms into a respective side contact surface and a respective guide surface via a recess surface.

18. The loose top according to claim 17, wherein each tangential contact surface extends from the axial contact surface to a clearance surface included in the front end.

19. The loose top according to claim 16, wherein the loose top has a diameter that is greater than an axial length of the loose top.

20. The loose top according to claim 16, wherein each side contact surface is formed on a material portion that is thickened in relation to a core which is represented by an inscribed circle between the concave limiting surfaces of the two chip flutes.

21. The loose top according to claim 16, wherein the two guide surfaces are cylindrical and/or conical.

22. The loose top according to claim 16, wherein each side contact surface is plane and delimited by a rotationally trailing limiting edge.

23. The loose top according to claim 22, wherein an imaginary diametrical line between diametrically opposed limiting edges along the two side contact surfaces, forms an acute angle ($\gamma$) with the respective side contact surface.

24. The loose top according to claim 16, wherein each tangential contact surface converges at an acute angle of convergence ($a$) toward one of the envelope part surfaces.

25. The loose top according to claim 16, wherein, adjacent to the axial contact surface, a male member is formed for the axial locking of the loose top.

26. The loose top according to claim 25, wherein the male member is a ridge situated behind a tangential contact surface.

* * * * *